Figure 1:
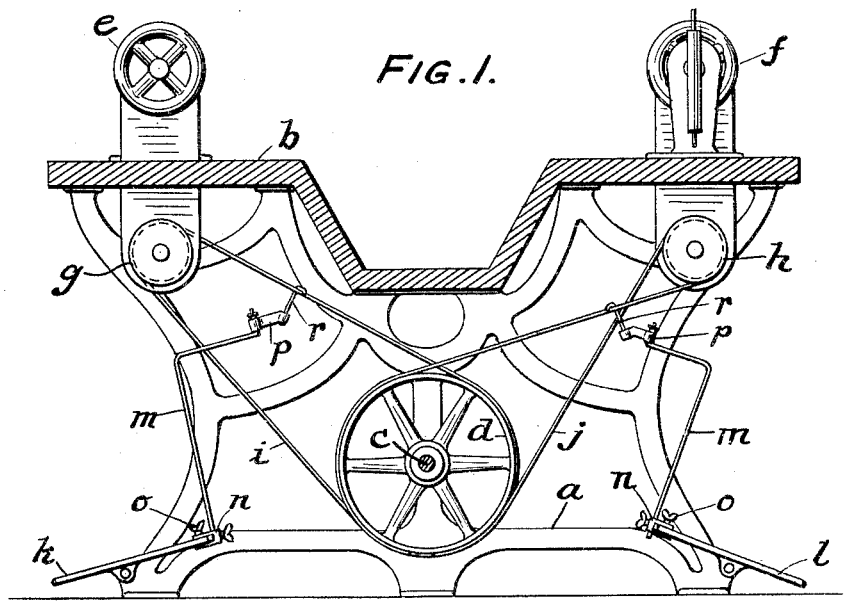

K. BUXBAUM.
COMBINED BELT SEPARATOR AND TIGHTENER.
APPLICATION FILED FEB. 18, 1914.

1,099,691.

Patented June 9, 1914.

WITNESSES:
Rob? R. Kitchel
E. E. Wall

INVENTOR
Karl Buxbaum
BY
Frank L. Busser
ATTORNEY.

UNITED STATES PATENT OFFICE.

KARL BUXBAUM, OF PHILADELPHIA, PENNSYLVANIA.

COMBINED BELT SEPARATOR AND TIGHTENER.

1,099,691.  Specification of Letters Patent.  Patented June 9, 1914.

Application filed February 18, 1914. Serial No. 819,366.

*To all whom it may concern:*

Be it known that I, KARL BUXBAUM, a citizen of the United States, residing at Philadelphia, county of Philadelphia, and State of Pennsylvania, have invented a new and useful Improvement in Combined Belt Separators and Tighteners, of which the following is a full, clear, and exact description, reference being had to the accompanying drawings, which form a part of this specification.

Double head sewing machines, such as are commonly used in shirt waist factories, are usually arranged on opposite sides of a table beneath which the power shaft extends. These machines are arranged to be driven all in the same direction from round belts connecting the power shaft with pulleys adapted to be clutched and unclutched from the driving shafts of the sewing machines. These pulleys are operated from foot treadles arranged beneath the several machines and readily accessible to the operators.

With the above arrangement it will be understood that while the machines on one side of the table are driven from uncrossed driving belts, the belts driving the machines on the other side of the table are necessarily crossed. The two reaches of a crossed belt necessarily tend to run in precisely the same vertical plane, with the result that at the point between the power shaft and the machine shaft at which the two reaches of the belt cross, they are constantly in sliding contact. This frictional contact, which is greatly increased by the rubbing against the leather of the usual metal link connecting together the ends of the belt, wears away the belt so rapidly that its effective life is quite limited, necessitating frequent renewals at considerable expense. Further, there is more or less waste of power due to frictional resistance. It is of course also necessary to have all the belts quite taut so that they will effectively drive, whereas if the belts were taut only during the time that they act to transmit power and were slack at other times, much wear and tear would be avoided.

The object of my invention is to provide a simple and inexpensive device which will act to separate the two reaches or runs of a crossed belt at the point of crossing while at the same time avoiding rubbing contact between the belt and the separator, and avoiding also separating the two reaches of the belt to an extent which would cause them to deviate to a substantially greater extent than heretofore from the same vertical plane, and which will also perform the function of tightening the belt during transmission of power while allowing the belt to slacken when the power is thrown off.

A further object of the invention is to so construct the device that it will be operated from the ordinary foot treadle now in use for clutching and unclutching the machine shaft, in such manner that it will act to tighten the belt when the power is thrown on and will maintain its function as a separator whether the power is thrown on or off as well as in the lateral shift of the belt accompanying the disruption or reinstatement of the driving connection.

A preferred embodiment of my invention is shown in the accompanying drawings, in which—

Figure 2:
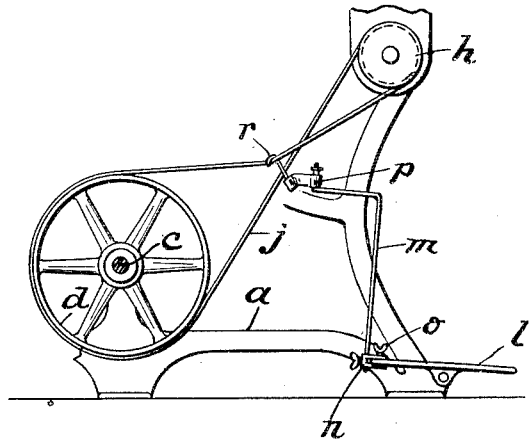
Figure 3:
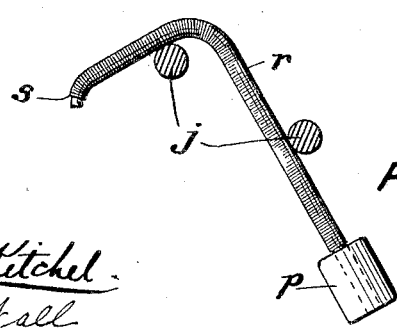

Figure 1 is an elevation of power shaft table, machines, and connecting belts with my invention applied, showing the position of the combined separator and tightener when the belt is running idle. Fig. 2 is an elevation of a part of Fig. 1, showing the position of the combined separator and tightener when the crossed belt is transmitting motion to the sewing machine. Fig. 3 is a detail view of part of the combined separator and tightener, showing the location of the same relatively to the crossed driving belt.

The table frame $a$ carries bearings for the power shaft $c$, which extends longitudinally of the table frame midway between the sides thereof and near the floor. The frame $a$ supports the table $b$ along opposite sides of which are arranged the sewing machines $e$, $f$, carrying the clutch pulleys $g$, $h$. The driving pulley $d$ on the power shaft $c$ is connected with the driven pulley $g$ by means of the straight-loop or uncrossed belt $i$; while the driving pulley $d$ is connected with the driven pulley $h$ by the crossed belt $j$. $k$ and $l$ are foot treadles pivoted on the base of the table frame and adapted (by well known means not herein shown) to be moved from the position shown in Fig. 1 to that shown in Fig. 2, to shift the pulleys *g* and *h* respectively, for the purpose of clutching and unclutching the respective pulleys *g* and *h* with the shafts of the respective oppositely arranged sewing machines.

I will now describe the construction and arrangement of my combined belt separator and tightener.

*m* is a rod, the lower end of which has secured to it a clamp *n* carrying thumb nuts *o* for securing the rod to the inner free end of the treadle. As shown, this rod extends upward from the treadle, then inward and then upward, the last upward bend carrying a pivoted arm or holder *p*. The holder *p* has secured to it an inverted L-shaped finger *r*, one member of the L extending between the two reaches of the crossed belt *j* and the other member of the L extending over the upper reach of the belt. The finger *r* has coiled about it a thin spiral wire *s*, which turns freely on the finger under the influence of the sliding contact of the belt. The finger *r* is curved at the junction between its two members, and the outer end of the free member of the finger is bent obliquely downward, as shown in Fig. 3. It will be observed that by this construction the two reaches of the crossed belt are effectually separated and that the belt has a rolling, and consequently, as near as may be, a frictionless, contact with the coiled wire *s* on the finger *r*.

In Fig. 1, the belt is shown running idle and hence slack. When the treadle is depressed (which, as before stated, effects the clutching of the pulley *h* with the sewing machine shaft), the rod *m*, holder *p*, and finger *r* are drawn down, thus causing the free end member of the finger *r* to draw down one reach of the belt and tighten it, as shown in Fig. 2. It will thus be understood that the belt is tightened automatically when it is converted from an idler to a driving belt and that it acts as a separator equally well under both conditions.

When the power is thrown off or on, the pulley *h* is moved axially on its shaft, this changing somewhat the plane of travel of the belt. This, however, does not interfere with the operation of the finger *r*, which, in this shift of position of the belt, swings freely on the upper bend of the rod *m*.

While I have described the operation of the device as a separator and tightener as applied to a crossed belt, it will be understood that it is well adapted to perform the function of a tightener as applied to an uncrossed belt. Such an application of the invention is shown on the left hand side of Fig. 1.

Having now fully described my invention, what I claim and desire to protect by Letters Patent is:

1. A belt separator and tightener comprising a finger adapted to extend between the oppositely running reaches of a crossed belt and over one of said reaches, said finger constructed to have rolling surface contact with the belt.

2. A belt separator and tightener comprising a finger extending obliquely upward and thence transversely, the transverse section adapted to overlie one of the reaches of a crossed belt, said finger constructed to have rolling surface contact with the belt.

3. A belt separator and tightener comprising a rod adapted for attachment to a treadle, a holder supported on the rod, and a finger supported on the holder and extending therefrom obliquely upward and thence transversely so as to overlie one of the reaches of a crossed belt.

4. A belt separator and tightener comprising a rod adapted for attachment to a treadle, a holder pivoted on the rod, and a finger carried by the rod adapted to extend between the oppositely running reaches of a crossed belt and over one of said reaches.

5. A belt separator and tightener comprising a finger adapted to extend between the reaches of a crossed belt and a wire loosely coiled about the finger and adapted to turn around the same in the running of the contacting belt.

6. A belt separator and tightener comprising an inverted L-shaped finger adapted to extend between the reaches of a crossed belt and over one of said reaches.

7. A belt separator and tightener comprising a holder, a finger extending upward from the holder adapted to extend between the reaches of a crossed belt and thence curved transversely to provide a member adapted to overlie one of said reaches.

8. A belt separator and tightener comprising a holder, a finger extending upward from the holder adapted to extend between the reaches of a crossed belt and thence curved transversely to provide a member adapted to overlie one of said reaches and thence curved obliquely downward.

9. A belt separator and tightener comprising a holder, a finger extending upward from the holder adapted to extend between the reaches of a crossed belt and thence curved transversely to provide a member adapted to overlie one of said reaches, and a wire loosely coiled about the finger.

10. A belt separator and tightener comprising a holder, and a finger supported thereon and extending successively upwardly, transversely and downwardly, and a wire loosely coiled around the finger.

11. A belt separator and tightener, a rod adapted for attachment to a treadle, a holder pivoted thereon, and a finger supported on the holder and extending successively upwardly, transversely and downwardly.

12. A belt separator and tightener comprising a rod adapted for attachment to a treadle, a holder adapted to swing transversely on the rod, and a finger attached to the rod and adapted to extend between the oppositely running reaches of a crossed belt.

In testimony of which invention, I have hereunto set my hand, at Philadelphia, on this 18th day of February, 1914.

KARL BUXBAUM.

Witnesses:
M. M. HAMILTON,
E. E. WALL.

Copies of this patent may be obtained for five cents each, by addressing the "Commissioner of Patents, Washington, D. C."